(12) United States Patent
Sinha et al.

(10) Patent No.: US 7,515,531 B2
(45) Date of Patent: Apr. 7, 2009

(54) APPARATUS AND METHODS FOR THE COMMUNICATION AND FAULT MANAGEMENT OF DATA IN A MULTIPATH DATA NETWORK

(75) Inventors: Nishith Sinha, Mableton, GA (US); Steven F. Baker, Alpharetta, GA (US); James Scott Wineinger, Ames, IA (US)

(73) Assignee: Cox Communications, Atlanta, GA (US)

( * ) Notice: Subject to any disclaimer, the term of this patent is extended or adjusted under 35 U.S.C. 154(b) by 958 days.

(21) Appl. No.: 10/919,743

(22) Filed: Aug. 17, 2004

(65) Prior Publication Data

US 2006/0039291 A1   Feb. 23, 2006

(51) Int. Cl.
*G01R 31/08* (2006.01)
(52) U.S. Cl. .................. 370/224; 370/228; 370/244
(58) Field of Classification Search ......... 370/216–228, 370/242–245; 714/717; 709/251; 398/1–8, 398/58, 59, 136–139; 381/15–17
See application file for complete search history.

(56) References Cited

U.S. PATENT DOCUMENTS

| 6,256,292 | B1 * | 7/2001 | Ellis et al. ................ 370/227 |
| 7,113,699 | B1 * | 9/2006 | Bhate et al. .............. 370/224 |
| 7,307,947 | B2 * | 12/2007 | Okuno .................... 370/222 |
| 2005/0129403 | A1 * | 6/2005 | Koopferstock ........... 398/83 |

* cited by examiner

*Primary Examiner*—Ian N Moore
(74) *Attorney, Agent, or Firm*—Merchant & Gould

(57) ABSTRACT

An apparatus and methods are provided for the communication of a data stream and management of faults in a multipath data network having a protected ring-in-ring network architecture. The data stream is communicated over redundant paths between various nodes located throughout the network. Each node is capable of dropping and inserting data from the data stream before passing it on to the next node. A single transmitter in communication with an intelligent splitter at each node is utilized to simultaneously transmit the data stream over the redundant paths. In the event of a fault over one of the paths in the network, the intelligent splitter manages the operation of the single transmitter so that the data stream is communicated over an alternate path to circumvent the fault.

24 Claims, 11 Drawing Sheets

APPARATUS AND METHODS FOR THE COMMUNICATION AND FAULT MANAGEMENT OF DATA IN A MULTIPATH DATA NETWORK

TECHNICAL FIELD

The present invention relates to the communication of data in a data network. More particularly, the present invention is related to the communication and fault management of data in a multipath data network.

BACKGROUND OF THE INVENTION

Data networks contain various network devices, such as switches, for sending and receiving data between multiple locations. Many bandwidth-intensive data applications such as video conferencing, Video-on-Demand ("VoD"), and Subscription Video-on-Demand ("SVoD") require data link layer (i.e., Layer 2) networks capable of supporting Gigabit per second or higher data transfer rates. These high speed networks, which include Gigabit Ethernet ("GbE") or Asynchronous Transfer Mode ("ATM") networks, require a physical layer network such as a Synchronous Optical Network ("SONET") which is capable of transporting high speed data over large distances to one or more destinations. SONET networks are typically deployed on a two-fiber protected ring-in-ring architecture to provide redundancy in the event of a fault or fiber break. In a typical ring-in-ring architecture, a primary ring transmits data in one direction (i.e., clockwise) while a backup ring transmits the data in the reverse direction. Thus, if the primary ring fails, the backup takes over.

Currently, in order to enable the redundancy provided by SONET ring-in-ring architectures, each location around the rings (i.e., each node or hub) requires two transmitters (one for each ring) to be deployed for communicating data. However, currently transmitters for communicating data in optical networks are very expensive. This expense is one of the primary drawbacks in the implementation of high speed data networks.

It is with respect to these considerations and others that the present invention has been made.

SUMMARY OF THE INVENTION

In accordance with the present invention, the above and other problems are solved by an apparatus and methods for the communication of a data stream and management of faults in a multipath data network having a protected ring-in-ring network architecture. The data stream is communicated over redundant paths between various nodes located throughout the network. Each node is capable of dropping and inserting data from the data stream before passing it on to the next node. A single transmitter in communication with an intelligent splitter at each node is utilized to simultaneously transmit the data stream over the redundant paths. In the event of a fault over one of the paths in the network, the intelligent splitter manages the operation of the single transmitter so that the data stream is communicated over an alternate path to circumvent the fault.

According to one method, a data stream is received at one of various nodes in the data network. The data stream is simultaneously communicated over a first path and a second path in the data network. The method further includes dropping a portion of the data received from the data stream, adding new data to the data stream, and providing a single transmitter for simultaneously transmitting the data stream over the first and second paths to adjacent nodes in the data network. The method may further include parsing the data stream for a control stream. The control stream includes state information indicative of a fault in the data network. The method may further include determining from the state information that a fault is adjacent to an adjacent node in the data network and transmitting the data stream to the adjacent node in the data network over the first path, receiving a return data stream from the adjacent node, and passing through the return data stream over a second path in the data network to circumvent the fault.

The method may further include determining if the state information indicates that a fault is adjacent to a node in the data network and, if so, then simultaneously transmitting the data stream over the first path and the second path in the data network to circumvent the fault. The fault may include a loss of data over the first path or the second path in the data network. One or more nodes may be located downstream from the fault, upstream from the fault, isolated downstream from the fault, or isolated upstream from the fault. The data network may include an optical network having a bidirectional ring-in-ring architecture. The data stream may include an optical Ethernet data stream. The control stream may be embedded in the data stream and include a SONET communications control channel. The second path may be a protected path in the data network.

In accordance with other aspects, the present invention relates to an apparatus for communicating data streams in a multipath data network. The apparatus includes a first receiver operative to receive data from a first data stream communicated over a primary path in the data network, a second receiver operative to receive data from a second data stream communicated over a secondary path in the data network, a transmitter operative to transmit data received from a node in the data network, a switch operative to receive data from the first receiver and the second receiver and send data to the transmitter, and an intelligent splitter. The intelligent splitter is operative to receive the data streams communicated over the primary and secondary paths in the data network, send the first and second data streams to the first and second receivers, receive a modified data stream from the transmitter, and simultaneously transmit the modified data stream over the primary and secondary paths in the data network. The intelligent splitter may be further operative to parse the data stream for a control stream including state information indicative of a fault in the data network. If the state information indicates that the fault is a downstream fault, then the intelligent splitter may be operative to send the second data stream to the second receiver, transmit the modified data stream over the secondary path, and pass through a return data stream over the primary path. If the state information indicates that the fault is an isolated downstream fault, then the intelligent splitter may be operative to send the second data stream to the second receiver, and simultaneously transmit the modified data stream received from the transmitter over both the primary and secondary paths. If the state information indicates that the fault is an upstream fault, then the intelligent splitter may be operative to send the first data stream to the first receiver, transmit the modified data stream over the primary path, and pass through a return data stream over the secondary path. The switch may be further operative to drop a portion of the data from the first and second data streams received from the receiver and send new data to the transmitter for inclusion in the modified data stream.

These and various other features as well as advantages, which characterize the present invention, will be apparent from a reading of the following detailed description and a review of the associated drawings.

DETAILED DESCRIPTION OF THE INVENTION

Figure 1:
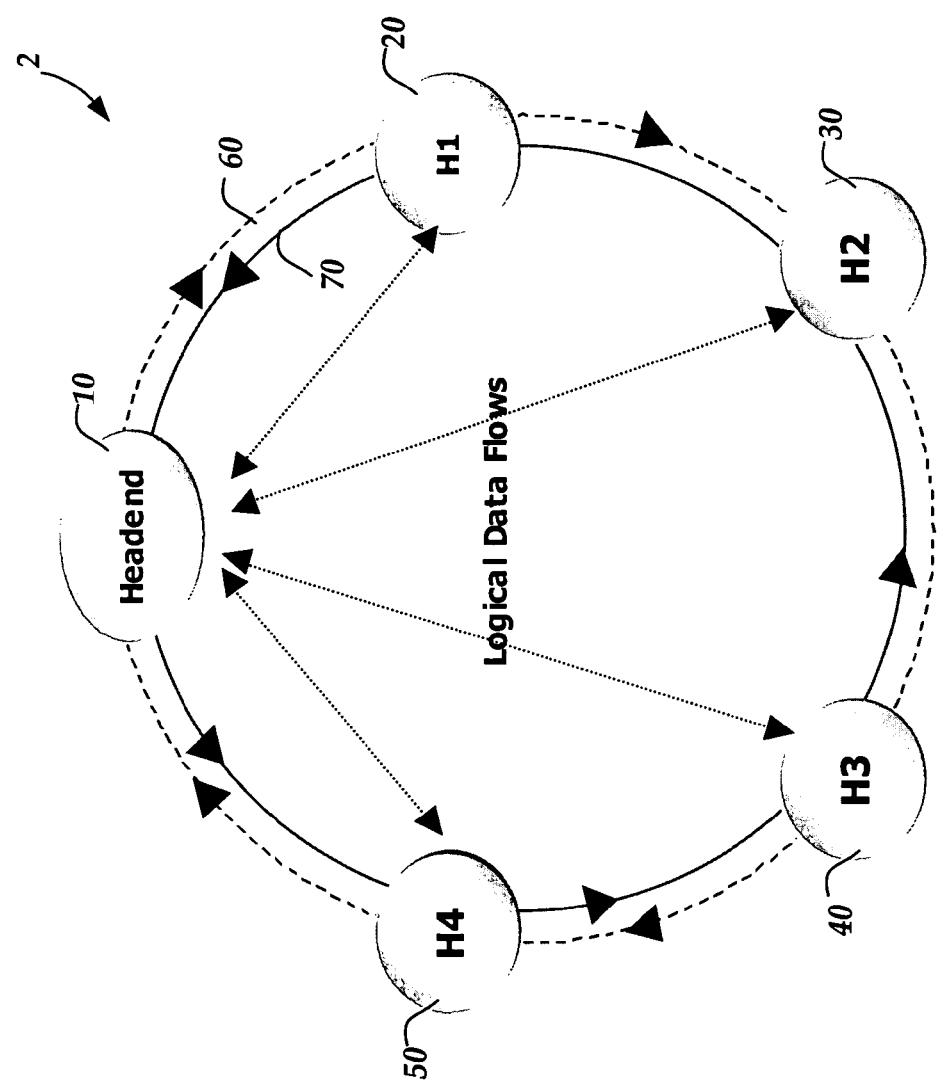
FIG. 1 is a diagram of a multipath data network according to one embodiment of the present invention.

Embodiments of the present invention provide for an apparatus and methods for the communication of a data stream and management of faults in a multipath data network having a protected ring-in-ring network architecture. The data stream is communicated over redundant paths between various nodes located throughout the network. Each node is capable of dropping and inserting data from the data stream before passing it on to the next node. A single transmitter in communication with an intelligent splitter at each node is utilized to simultaneously transmit the data stream over the redundant paths. In the event of a fault over one of the paths in the network, the intelligent splitter manages the operation of the single transmitter so that the data stream is communicated over an alternate path to circumvent the fault. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Embodiments of the present invention may be generally employed in a multipath data network 2 as shown in FIG. 1. As shown in FIG. 1, the multipath data network 2 has a protected ring-in-ring architecture for communicating a data stream over a primary path 60 (indicated by a dashed ring flowing in the clockwise direction) and a secondary path 70 (indicated by a solid ring flowing in the counter-clockwise direction). It will be appreciated that the secondary path 70 may be utilized as a redundant or protect path should a fault occur over the primary path 60 in the multipath data network 2. In the multipath data network 2, the data stream is communicated by splitting the transmission of the data stream over both the primary path 60 and the secondary path 70 by a headend 10 and nodes H1 (20), H2 (30), H3 (40), and H4 (50). It should be understood that through this description, the headend 10 and nodes H1 (20), H3 (40), and H4 (50) may alternatively be described as nodes 10, 20, 30, 40, and 50.

Those skilled in the art will appreciate that the multipath data network 2 may be physically implemented as a two fiber ring-in-ring configuration, such as a Universal Path Switched Ring ("UPSR"), and that the nodes 10-50 include fiber-optic transmission systems configured for optical communication in a Synchronous Optical Network ("SONET") environment. As known to those skilled in the art, SONET is a standard for connecting fiber-optic transmission systems and allows data streams communicated at different rates to be multiplexed. SONET also enables a control channel to be embedded in a data flow for communicating various Section Level Control messages related to one or more states of the network.

During normal operation, each node in the multipath data network 2 receives a data stream from an adjacent upstream node over the primary path 60 and parses the data stream for data intended for that node. Data identified intended for a node is then "dropped" or removed from the data stream and distributed to one or more node clients. Similarly, data from one or more node clients intended for another node (such as the headend) is inserted in the data stream which then continues to be transmitted to an adjacent downstream node over the primary path 60 and the secondary path 70. Those skilled in the art will appreciate that this operation is known as "drop and continue" deployment. Drop and continue deployment will be discussed in further detail in the description of the nodes 10-50 in FIGS. 2-4, below. It should be understood that although the data communication in the multipath network 2 is described as physically flowing from node to node, it will be appreciated that the data flows in the network are full duplex routes between the headend 10 and each node 20-50 as shown by the dotted arrows in FIG. 1.

Figure 2:
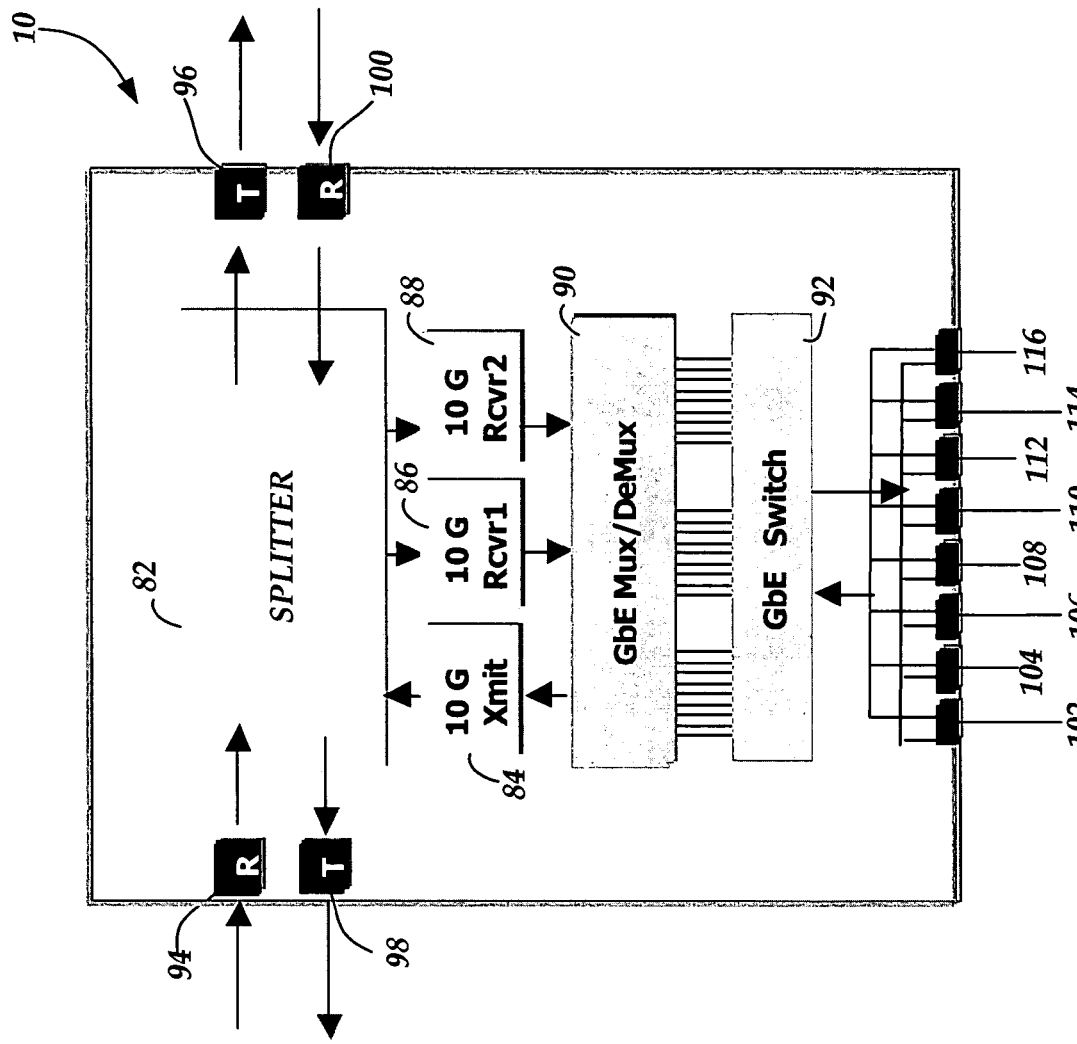
FIG. 2 is a block diagram of a node in the multipath data network of FIG. 1, according to one embodiment of the present invention.

FIG. 2 is a block diagram of a node 20 in the multipath data network 2 discussed above in FIG. 1, according to one embodiment of the invention. The node 20 includes network ports 94, 96, 98, and 100. Network ports 94 and 96 are utilized for receiving and transmitting a data stream over the primary path ring 60 while network ports 98 and 100 are utilized for receiving and transmitting a data stream over the secondary path ring 70. It should be noted that the transmit and receive ports 94, 96, 98, and 100 are reserved for each path so that the node 20 may communicate bi-directionally. The network ports 94, 96, 98, and 100 are in communication with an intelligent splitter 82.

The intelligent splitter 82 is in communication with a transmitter 84 for transmitting data and two receivers 86 and 88 for receiving data. The intelligent splitter 82 receives data from the transmitter 84 and splits the transmission over the transmit network ports 96 and 100 so that data may be simultaneously communicated over the primary path 60 and the secondary path 70. The intelligent splitter 82 also routes data from the data stream received by receive network ports 94 and 98 to the receivers 86 and 88. The intelligent splitter 82 may also be configured to transmit data from the transmitter 84 over one path while simultaneously passing through data received over the other path. It should be understood that when the intelligent splitter 82 is in "pass-through" operation a received data stream is not routed to either receiver but simply passed through to the next node. This pass-through operation may occur, for example, when a fault is detected on the primary path in the multipath data network 2. It will be appreciated by those skilled in the art that the operations of the intelligent splitter 82 may be an optical component based on control logic for implementing logical operations for data communication and fault management between the nodes in the multipath data network 2. The intelligent splitter 82 is also configured to parse the incoming data stream for embedded control messaging. The control messaging may provide information related to a current state of the multipath data network 2 such as whether the network is in a normal or protected state and the location of a fault relative to a node in the network. The various logical operations performed by the intelligent splitter 82 will be discussed in detail in the description of FIGS. 11-15, discussed below.

The node 20 also includes a Multiplexer/DeMultiplexer (Mux/DeMux) 90 in communication with a switch 92. The Mux/DeMux 90 converts incoming data from the receivers 86 and 88 into individual data channels (i.e., data streams) for communication to the switch 92. The switch 92 receives the converted data from the Mux/DeMux 90 and selectively drops, inserts, or passes various data channels to client ports 102-116. It should be understood that the data channels received by the switch 92 also includes the control messaging (discussed above) which includes information for distributing the data channels to the client ports 102-116. For example, a control message embedded within the data channels received by the switch 92 may indicate that data (such as channel guide information) is to be dropped and inserted with respect to client ports 114 and 116. Upon receipt of the control message, the switch 92 will selectively drop data to client ports 114 and 116 and also receive new data from client ports 114 and 116 to be included in a data stream to another node in the network. The switch 92 passes the new data along with the remaining data channels back to the Mux/DeMux 90 which combines the data channels into a new data stream for transmission by the transmitter 84 and the intelligent splitter 82 to another node in the network.

It will be appreciated that the various components discussed above with respect to the node 20 may be components conforming to the Gigabit Ethernet specification and compatible with a SONET network environment. As known by those skilled in the art, the Gigabit Ethernet specification supports data communication for applications requiring high data transfer rates, such as Video-On-Demand ("VoD") and Subscription Video-On-Demand ("SVoD"). For example, as shown in FIG. 2, the transmitter 84, receivers 86 and 88, Mux/DeMux 90, switch 92, and client ports 102-116 may all be Gigabit Ethernet components capable of communicating 10 Gigabit data streams in a data network. It will further be understood by those skilled in the art that the control message communicated by the components in the node 20 (and briefly discussed above) may be an embedded communications control channel in the inter-packet gap of the Ethernet framing contained in an optical Ethernet control stream. The control channel may be a SONET control channel conforming to the characteristics and definitions established by the SONET standard. A method and apparatus for embedding a SONET control channel within a Gigabit Ethernet optical data stream.

Figure 3B:
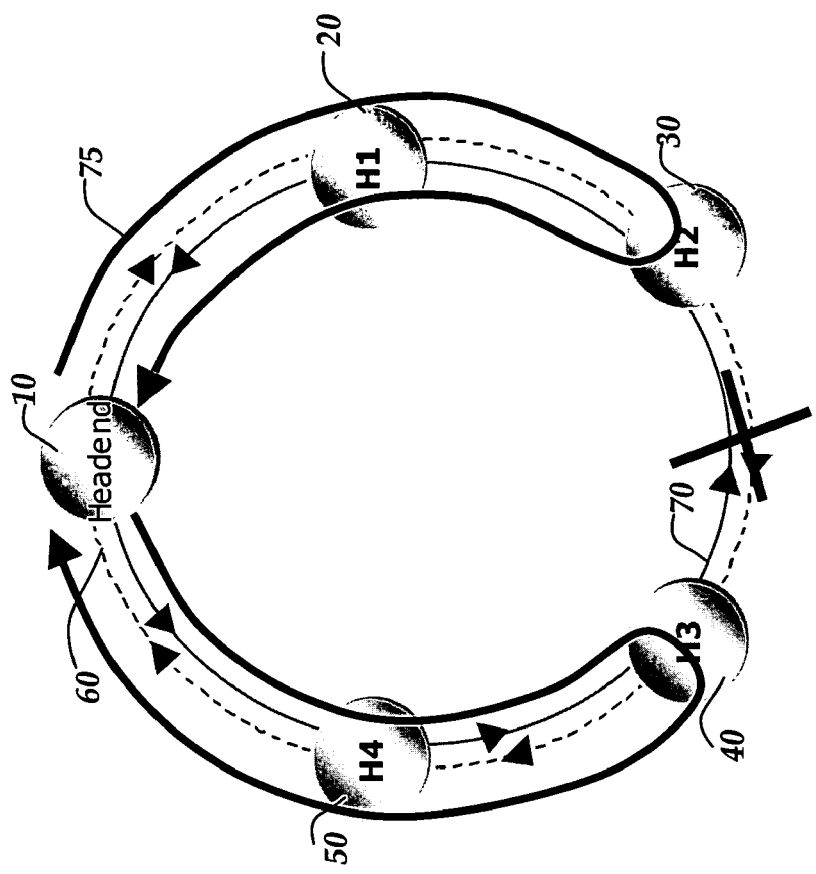
FIGS. 3A and 3B are diagrams of data stream flow in the multipath data network of FIG. 1 when the network is in a normal state and when the network is in a protected state, according to various embodiments of the present invention.
Figure 3A:
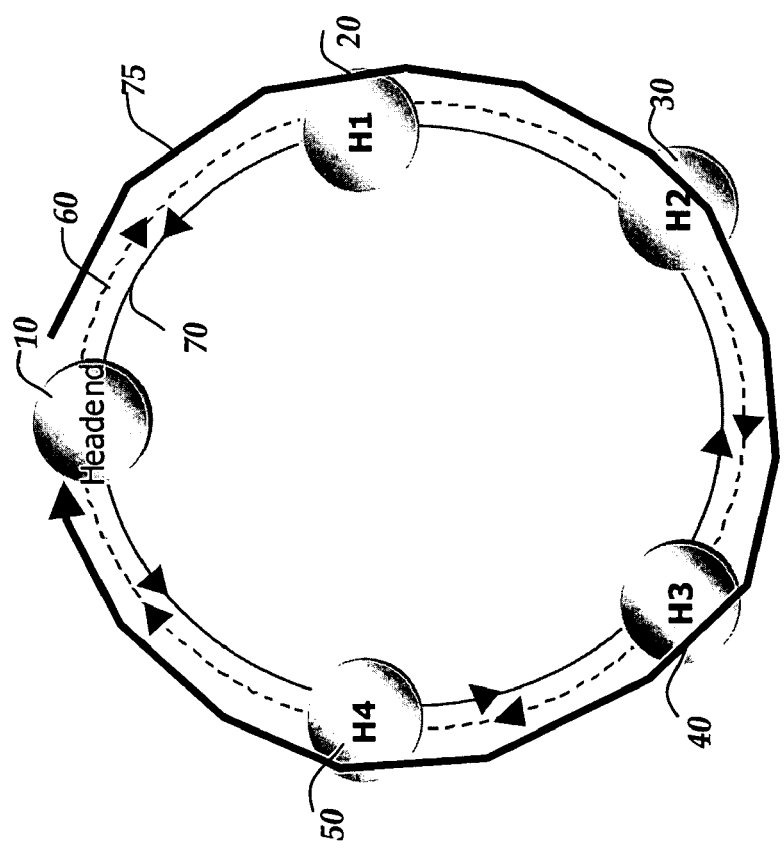

FIGS. 3A and 3B are diagrams of the data stream flow in the multipath data network 2 when the network is in a normal state and when the network is in a protected state. FIG. 3A shows the multipath data network 2 in a normal state where the data stream flow 75 travels along primary path 60 (clockwise) with the secondary path 70 serving as a backup or protected path. FIG. 3B shows the multipath data network 2 in a protected state due to a fault (indicated by the X) along the primary path 60. As described in the present description and the appended claims, a fault is defined as a loss of data or control signaling on the primary path. As shown in FIG. 3B, a primary fault causes the data stream flow 75 to utilize the secondary path 70 to circumvent the fault.

FIGS. 4-9 are flow diagrams describing the communication of a data stream and fault management in the multipath data network 2 of FIG. 1, according to various embodiments of the invention. FIGS. 4-9 will also be discussed in conjunction with FIGS. 9-15 which are block diagrams showing the communication of the data stream and fault management in a node in the multipath data network 2 of FIG. 1, according to various embodiments of the invention.

Figure 4:
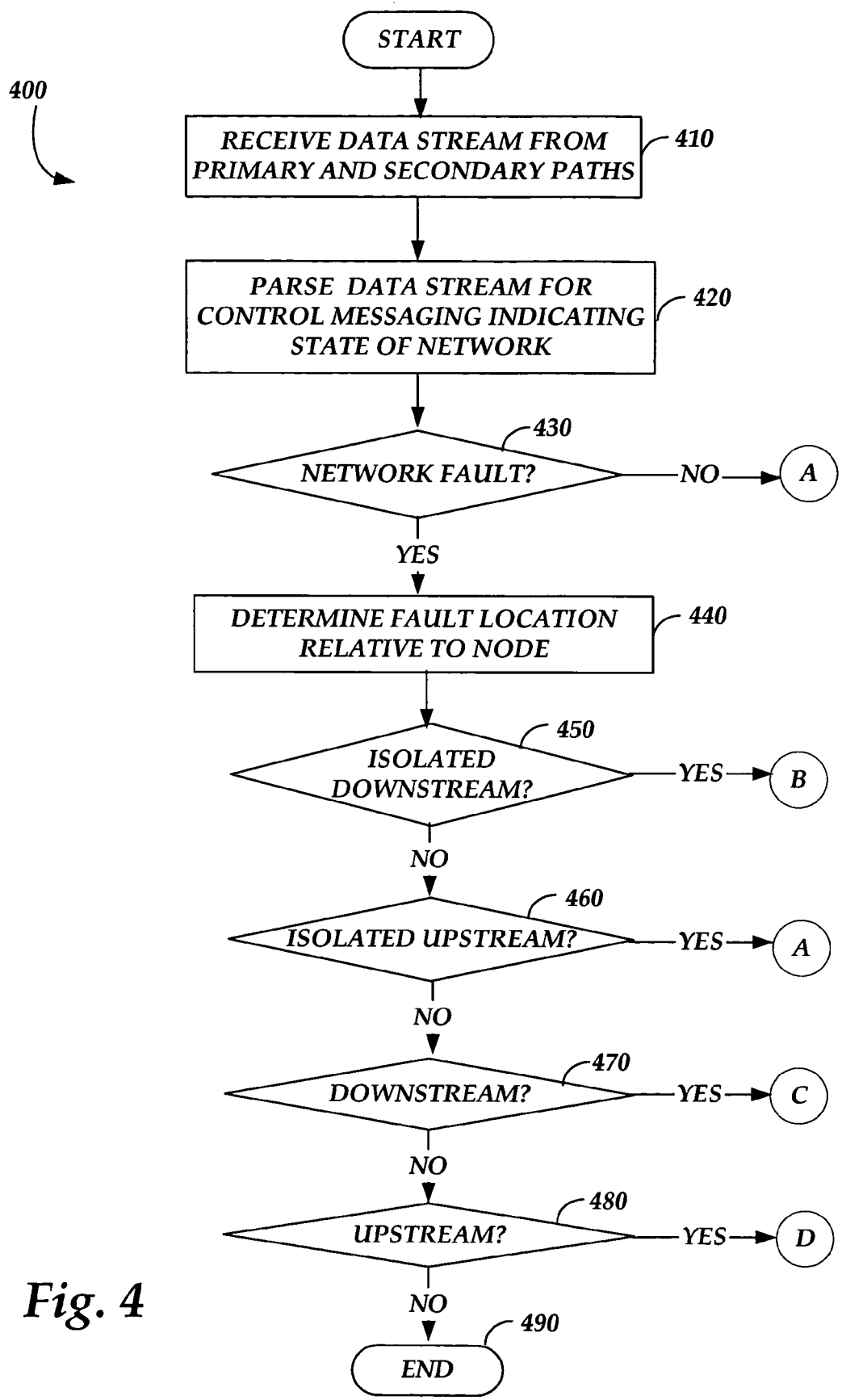
FIG. 4 is a flow diagram describing the communication of a data stream and fault management in the multipath data network FIG. 1, according to one embodiment of the present invention.

Referring now to FIG. 4, the logical operations 400 begin at operation 410 where the intelligent splitter 82 (described in FIG. 2) receives a data stream from the primary path 60 and the secondary path 70 over the multipath data network 2. The logical operations 400 then continue from operation 410 at operation 420 where the smart splitter 82 parses the data stream for control messaging to determine whether the multipath data network 2 is in a normal state or a protected state (i.e., a fault is present in the network). If the control messaging indicates that a fault is present in the network it also indicates the location of the fault. For example, in the network diagram of FIG. 3B, the fault is shown as located between nodes H2 (30) and H3 (40). Thus, in this example, the control messaging would indicate the fault is located between these two nodes. It should be understood that the control messaging is propagated to every node in the multipath data network 2 via the data stream communicated over the primary path 60 and the secondary path 70. The logical operations 400 then continue from operation 420 at operation 430.

At operation 430, if the control message received by the intelligent splitter 82 indicates that a network fault is not present in the multipath data network 2 (i.e., the network is in a normal state), the logical operations 430 then continue at off-page connector A which continues beginning at FIG. 5, discussed below. Continuing now with FIG. 4, if, however, the control message received by the smart splitter 82 indicates that a fault is present in the multipath data network 2 (i.e., the network is in a protected state), the logical operations 430 then continue from operation 430 at operation 440.

At operation 440 the intelligent splitter 82, after having received the control messaging indicating the presence of a fault in the network, then determines the location of the fault relative to the node in which it sits in the multipath data network 2. It should be understood that the location of the node relative to the fault is determinative of the operations implemented by the intelligent splitter 82 to circumvent the data stream around the fault. The logical operations 400 then continue from operation 440 at operation 450.

At operation 450, if the intelligent splitter 82 determines it sits in a node that is isolated downstream from the fault, the logical operations 400 then continue at off-page connector B which continues beginning at FIG. 6, discussed below. As used in this description and the appended claims, an isolated downstream fault is one in which a node is downstream from the primary fault and also adjacent to the fault. For example, referring now to FIG. 3B, the node H3 (40) is isolated downstream from the fault (indicated by the X) because it is downstream from the primary fault (i.e., downstream from the fiber cut on the clockwise primary path 60) and adjacent or next to the fault. If at operation 450, the intelligent splitter 82 determines that it sits in a node that is not isolated downstream from the fault, the logical operations 400 then continue at operation 460.

At operation 460, if the intelligent splitter 82 determines it sits in a node that is isolated upstream from the fault, the logical operations 400 then continue at off-page connector A which continues beginning at FIG. 5, discussed below. As used in this description and the appended claims, an isolated upstream fault is one in which a node is upstream from the primary fault and also adjacent to the fault. For example, referring now to FIG. 3B, the node H2 (30) is isolated upstream from the fault (indicated by the X) because it is upstream from the primary fault (i.e., upstream from the fiber cut on the clockwise primary path 60) and adjacent or next to the fault. If at operation 460, the intelligent splitter 82 determines that it sits in a node that is not isolated upstream from the fault, the logical operations 400 then continue at operation 470.

At operation 470, if the intelligent splitter 82 determines it sits in a node that is downstream from the fault, the logical operations 400 then continue at off-page connector C which continues beginning at FIG. 7, discussed below. As used in this description and the appended claims, a downstream fault is one in which a node is downstream from the primary fault but not adjacent to the fault. For example, referring now to FIG. 3B, the node H4 (50) is downstream from the fault (indicated by the X) because it is downstream from the primary fault (i.e., downstream from the fiber cut on the clockwise primary path 60) and not adjacent or next to the fault (i.e., the node H4 (50) is located next to the node H3 (40) which is adjacent to the fault. If at operation 470, the intelligent splitter 82 determines that it sits in a node that is not downstream from the fault, the logical operations 400 then continue at operation 480.

At operation 480, if the intelligent splitter 82 determines it sits in a node that is upstream from the fault, the logical operations 400 then continue at off-page connector D which continues beginning at FIG. 8, discussed below. As used in this description and the appended claims, an upstream fault is one in which a node is upstream from the primary fault but not adjacent to the fault. For example, referring now to FIG. 3B, the node H1 (20) is upstream from the fault (indicated by the X) because it is upstream from the primary fault (i.e., upstream from the fiber cut on the clockwise primary path 60) and not adjacent or next to the fault (i.e., the node H1 (20) is located next to the node H2 (30) which is adjacent to the fault. If at operation 480, the intelligent splitter 82 determines that it sits in a node that is not upstream from the fault, the logical operations 400 then end at operation 490.

Figure 5:
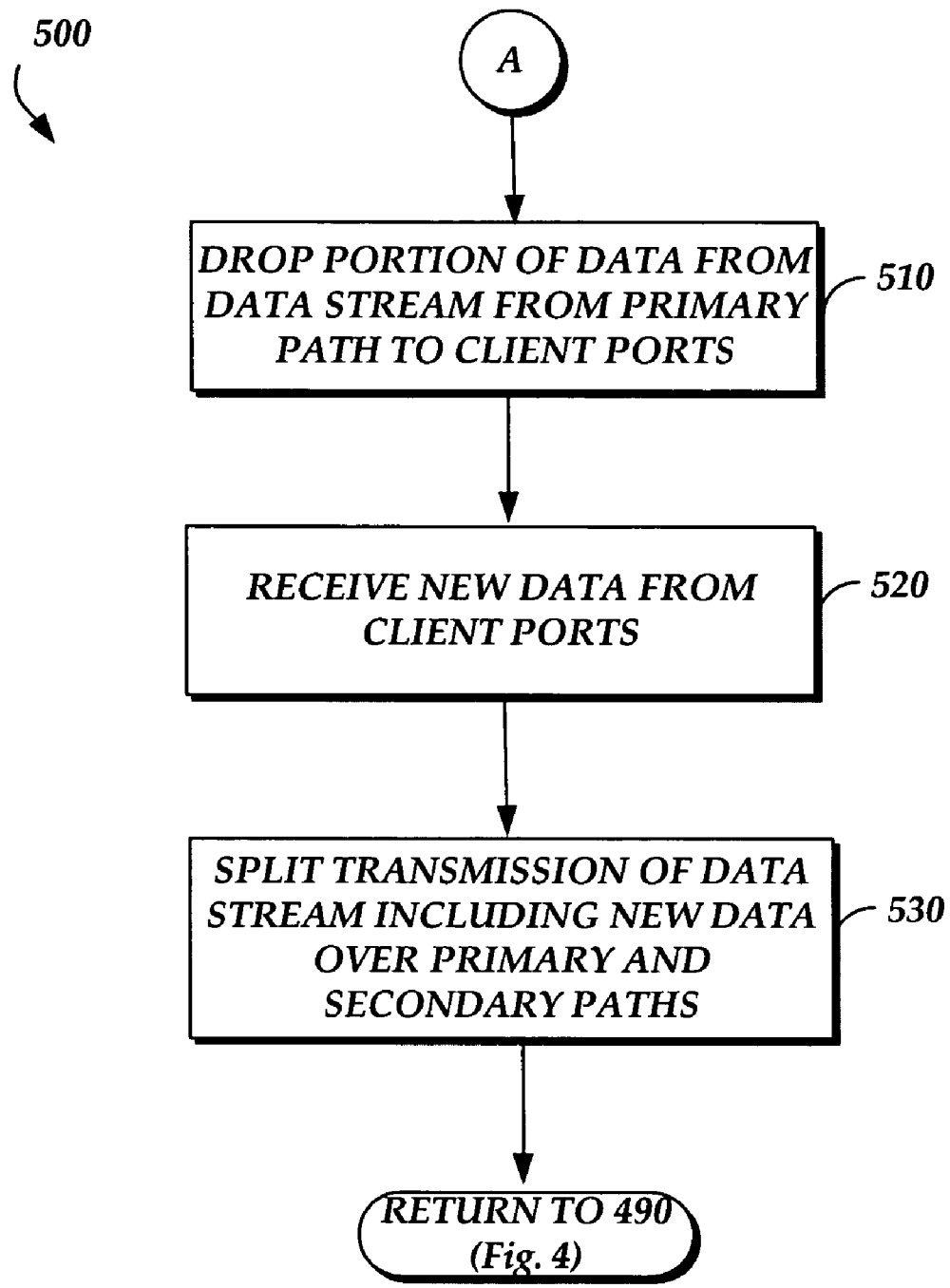
FIG. 5 is a flow diagram describing the communication of a data stream and fault management in the multipath data network FIG. 1, according to one embodiment of the present invention.

FIG. 5 is a flow diagram describing logical operations 500 for communicating data in the multipath data network 2 when the network is in a normal state, according to an embodiment of the present invention. The logical operations 500 will be discussed in conjunction with the node 20 shown in FIG. 9. The logical operations 500 begin from off-page connector A and continue at operation 510 where, after the intelligent splitter 82 receives a data stream (along with embedded control messaging) from the primary path 60 over the network port 94, the intelligent splitter then passes the data stream and the control messaging to the switch 92 through the receiver 86 and the Mux/DeMux 90. It should be noted that although the data stream is also received from the secondary path by the intelligent splitter 82, the data stream from the secondary path is not passed to the switch 92. The switch 92, upon receiving the data stream and control messaging from the intelligent splitter 82, then drops a portion of the data from the data stream received over the primary path to the client ports 102 and 104. The logical operations 500 then continue from operation 510 at operation 520.

At operation 520, the intelligent splitter 82 receives new data inserted by the client ports 102 and 104 from the switch 92 and the Mux/DeMux 90. As discussed above in the description of FIG. 2, the switch 92 passes back data channels representing the remaining portion of the original data received from the data stream (i.e., the portion of the data not dropped) along with the new data received from the client ports 102 and 104 to the Mux/DeMux 90. The Mux/DeMux 90 then combines the data channels back into a single data stream for transmission by the transmitter 84 and the intelligent splitter 82. The logical operations 500 then continue from operation 520 at operation 530.

At operation 530, the intelligent splitter 82 receives the modified data stream containing the new data and splits the transmission of the data stream by the transmitter 84 over the primary path 60 via the network port 96 and over the primary path 70 via the network port 98. It will be appreciated that in this configuration a single transmitter is used to communicate the data stream over both paths of the multipath network 2. The logical operations 500 then return from operation 530 to operation 490 (FIG. 4) where they then end.

It should be understood that the logical operations 500 carried out by the smart splitter 82 when the multipath data network 2 is in a normal state are identical to the logical operations carried out by the smart splitter 82 when a node is isolated upstream from a fault in the multipath data network 2. Thus, the node 30 in FIG. 3B, which is isolated upstream from the fault (as described in FIG. 4) communicates as if the network was in a normal state when notified of a fault.

Figure 6:
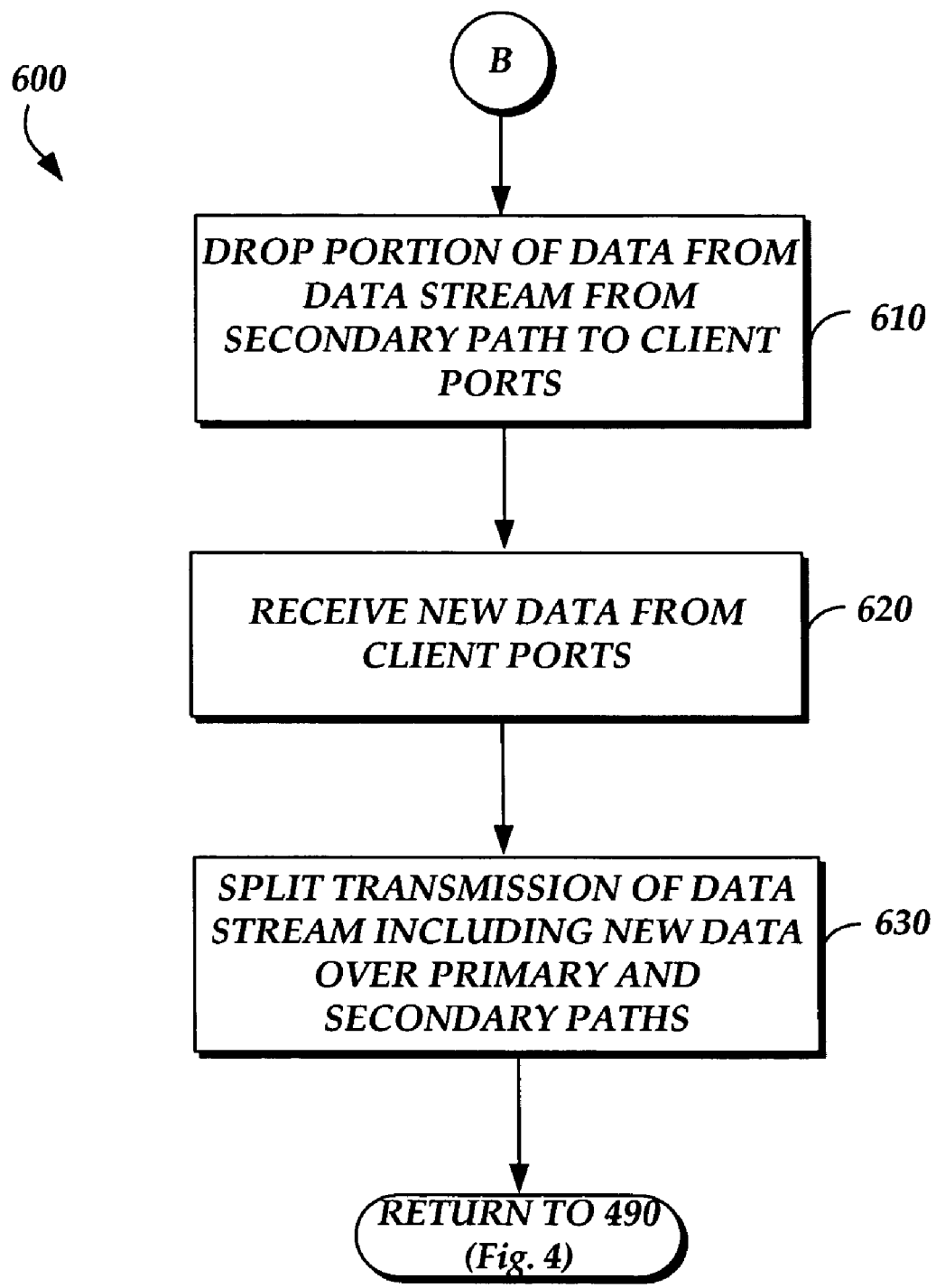
FIG. 6 is a flow diagram describing fault management in the multipath data network FIG. 1, according to one embodiment of the present invention.

FIG. 6 is a flow diagram describing logical operations 600 for circumventing data around a fault from an isolated downstream node, according to one embodiment of the present invention. The logical operations 600 will be discussed in conjunction with the node 40 shown in FIGS. 3B and 11. The logical operations 600 begin from off-page connector B and continue at operation 610 where the intelligent splitter 82 receives a data stream (along with embedded control messaging) from the secondary path 70 over the network port 100. After determining from the control messaging that the node 40 is isolated downstream from a detected fault, the intelligent splitter 82 passes the data stream and the control messaging to the switch 92 through the receiver 88 and the Mux/DeMux 90. It should be noted that the data stream being received from the primary path 60 is a return data stream from the upstream node 50 (as shown in FIG. 3B). The switch 92, upon receiving the data stream and control messaging from the intelligent splitter 82, then drops a portion of the data from the data stream received over the secondary path 70 to the client ports 102 and 104. The logical operations 600 then continue from operation 610 at operation 620.

At operation 620, the intelligent splitter 82 receives new data inserted by the client ports 106 and 108 from the switch 92 and the Mux/DeMux 90. As discussed above in the description of FIG. 2, the switch 92 passes back data channels representing the remaining portion of the original data received from the data stream (i.e., the portion of the data not dropped) along with the new data received from the client ports 106 and 108 to the Mux/DeMux 90. The Mux/DeMux 90 then combines the data channels back into a single data stream for transmission by the transmitter 84 and the intelligent splitter 82. The logical operations 600 then continue from operation 620 at operation 630.

At operation 630, the intelligent splitter 82 receives the modified data stream containing the new data and splits the transmission of the data stream by the transmitter 84 over the secondary path 70 via the network port 98 and over the primary path 60 via the network port 96. It will be appreciated that in this configuration a single transmitter is used to communicate the data stream over both paths of the multipath network 2 when there is a fault on the primary path 60. The logical operations 600 then return from operation 630 to operation 490 (FIG. 4) where they then end.

Figure 7:
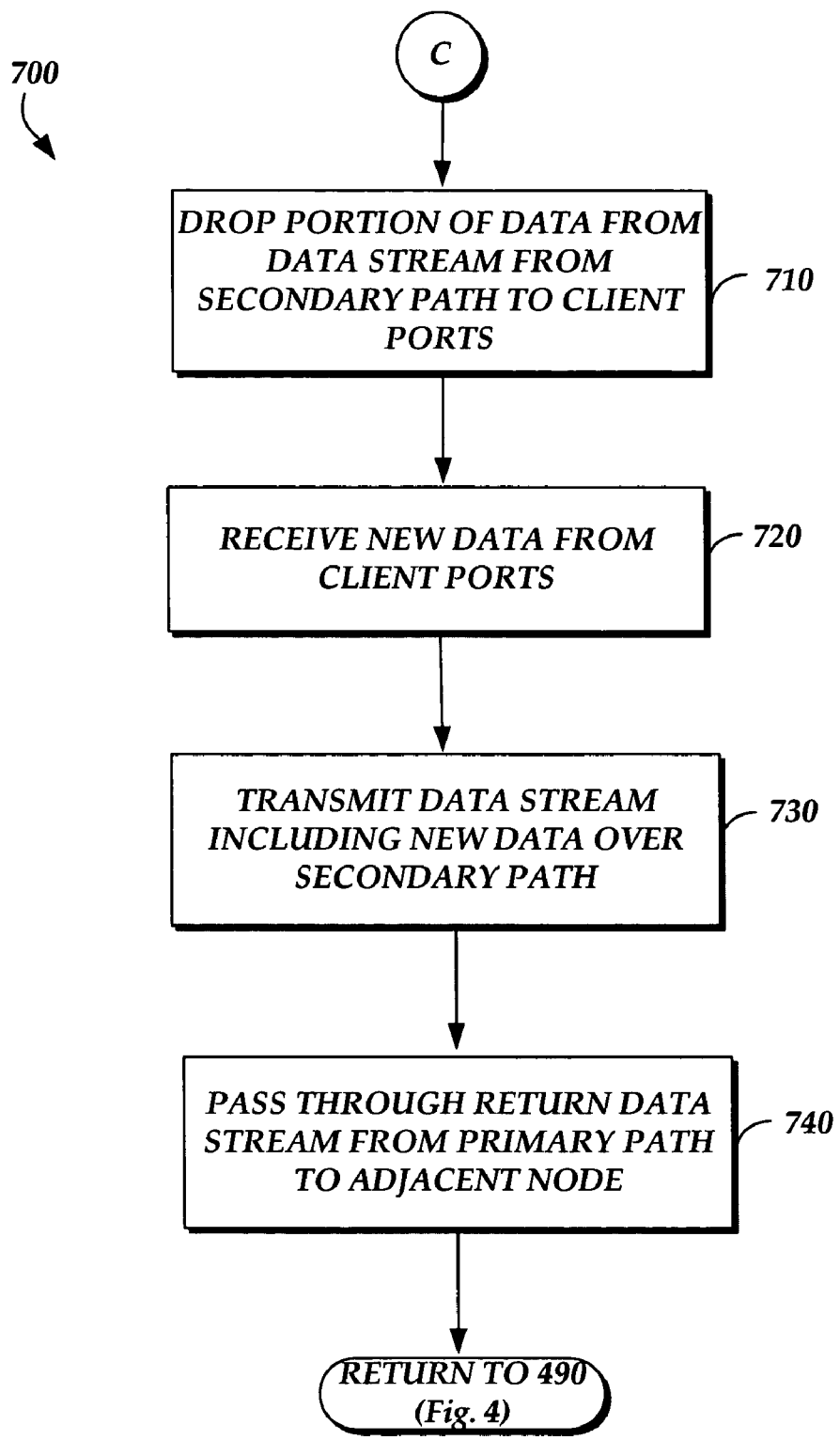
FIG. 7 is a flow diagram describing fault management in the multipath data network FIG. 1, according to one embodiment of the present invention.

FIG. 7 is a flow diagram describing logical operations 700 for circumventing data around a fault from a downstream node, according to one embodiment of the present invention. The logical operations 700 will be discussed in conjunction with the node 50 shown in FIGS. 3B and 10. The logical operations 700 begin from off-page connector C and continue at operation 710 where the intelligent splitter 82 receives a data stream (along with embedded control messaging) from the secondary path 70 over the network port 100. After determining from the control messaging that the node 50 is downstream from a detected fault, the intelligent splitter 82 passes the data stream and the control messaging to the switch 92 through the receiver 88 and the Mux/DeMux 90. The switch 92, upon receiving the data stream and control messaging from the intelligent splitter 82, then drops a portion of the data from the data stream received over the secondary path 70 to the client ports 110 and 112. The logical operations 700 then continue from operation 710 at operation 720.

At operation 720, the intelligent splitter 82 receives new data inserted by the client ports 110 and 112 from the switch 92 and the Mux/DeMux 90. As discussed above in the description of FIG. 2, the switch 92 passes back data channels representing the remaining portion of the original data received from the data stream (i.e., the portion of the data not dropped) along with the new data received from the client ports 110 and 112 to the Mux/DeMux 90. The Mux/DeMux 90 then combines the data channels back into a single data stream for transmission by the transmitter 84 and the intelligent splitter 82. The logical operations 700 then continue from operation 720 at operation 730.

At operation 730, the intelligent splitter 82 receives the modified data stream containing the new data and transmits the data stream from the transmitter 84 over the secondary path 70 via the network port 98 to adjacent node 40. The logical operations 700 then continue from operation 730 at operation 740. At operation 740, the intelligent splitter 82 receives and passes through the data stream from adjacent node 40 (which lies next to the fault) over the primary path 60 via network ports 94 and 96 to circumvent the fault. The logical operations 700 then return from operation 740 to operation 490 (FIG. 4) where they then end.

Figure 8:
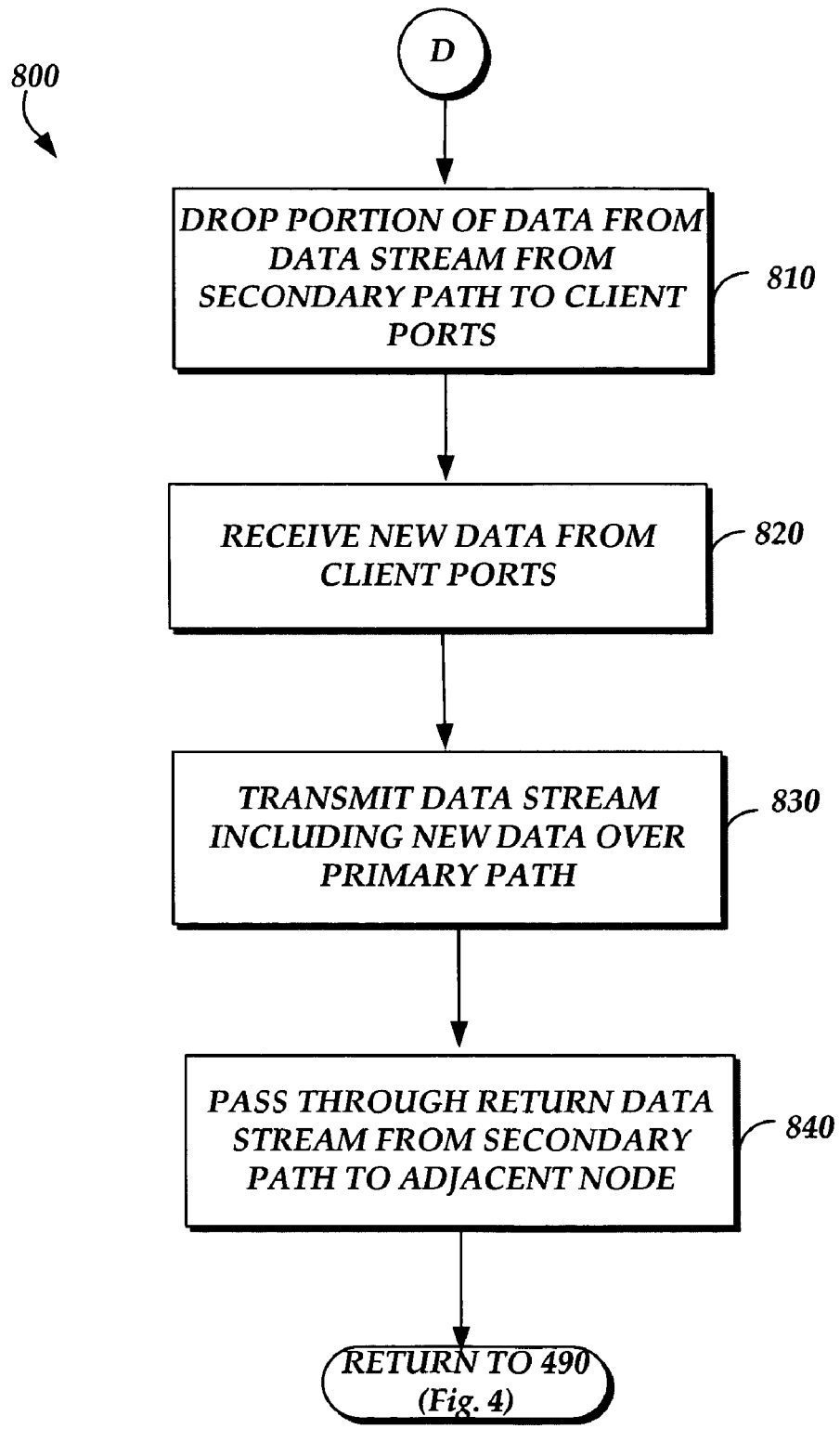
FIG. 8 is a flow diagram describing fault management in the multipath data network FIG. 1, according to one embodiment of the present invention.
Figure 9:
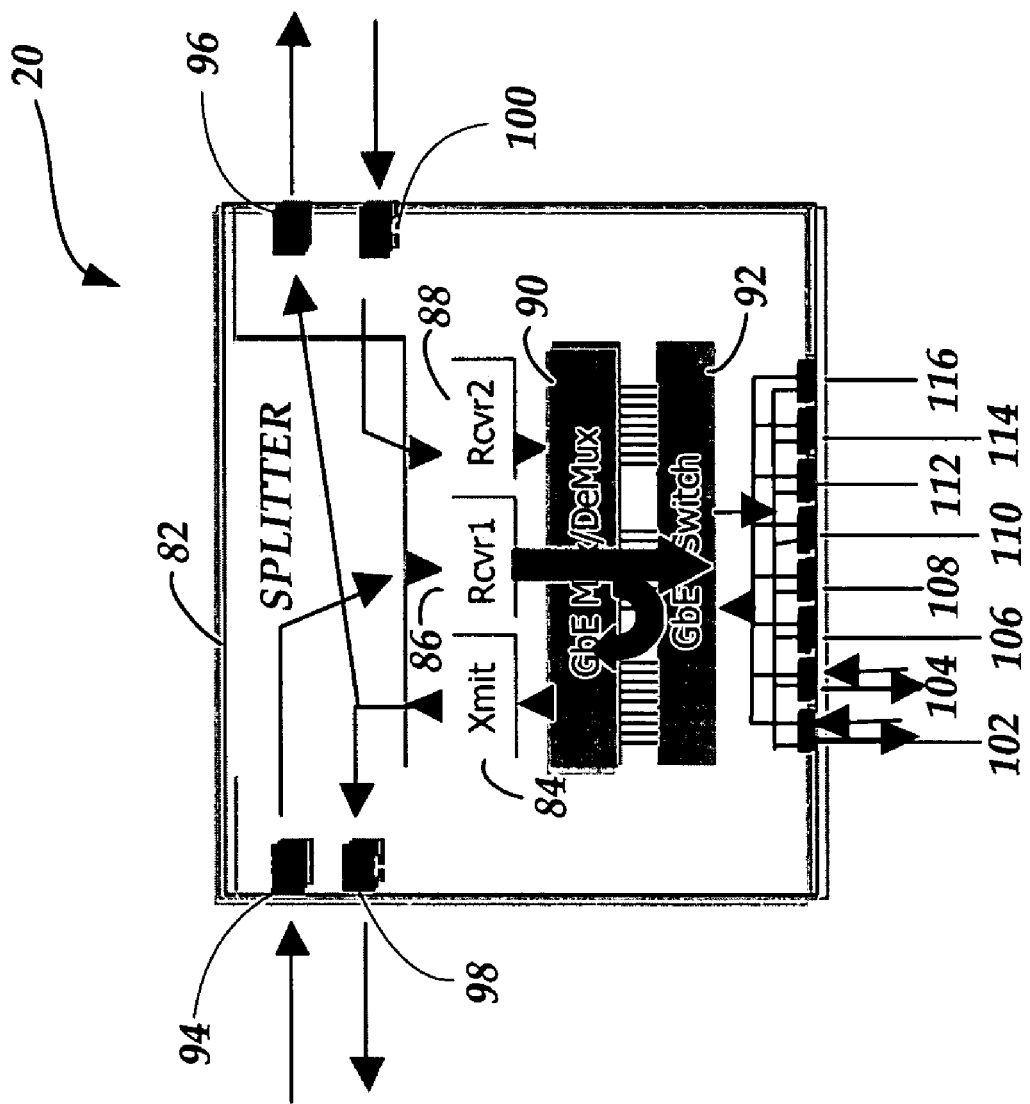
FIG. 9 is a block diagram of a node operating in a normal state of the multipath data network of FIG. 1, according to one embodiment of the present invention.
Figure 10:
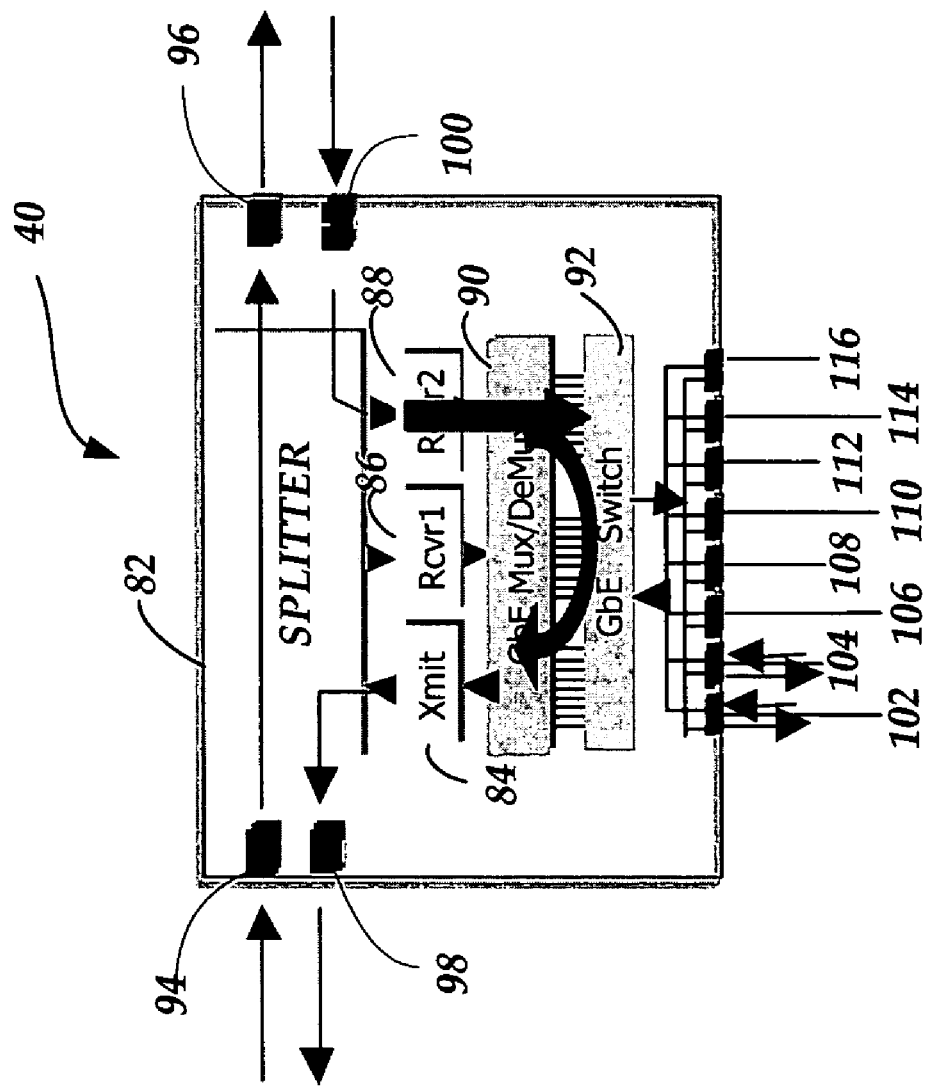
FIG. 10 is a block diagram of a node isolated downstream from a fault in protected state of the multipath data network of FIG. 1, according to one embodiment of the present invention.
Figures 11, 12:
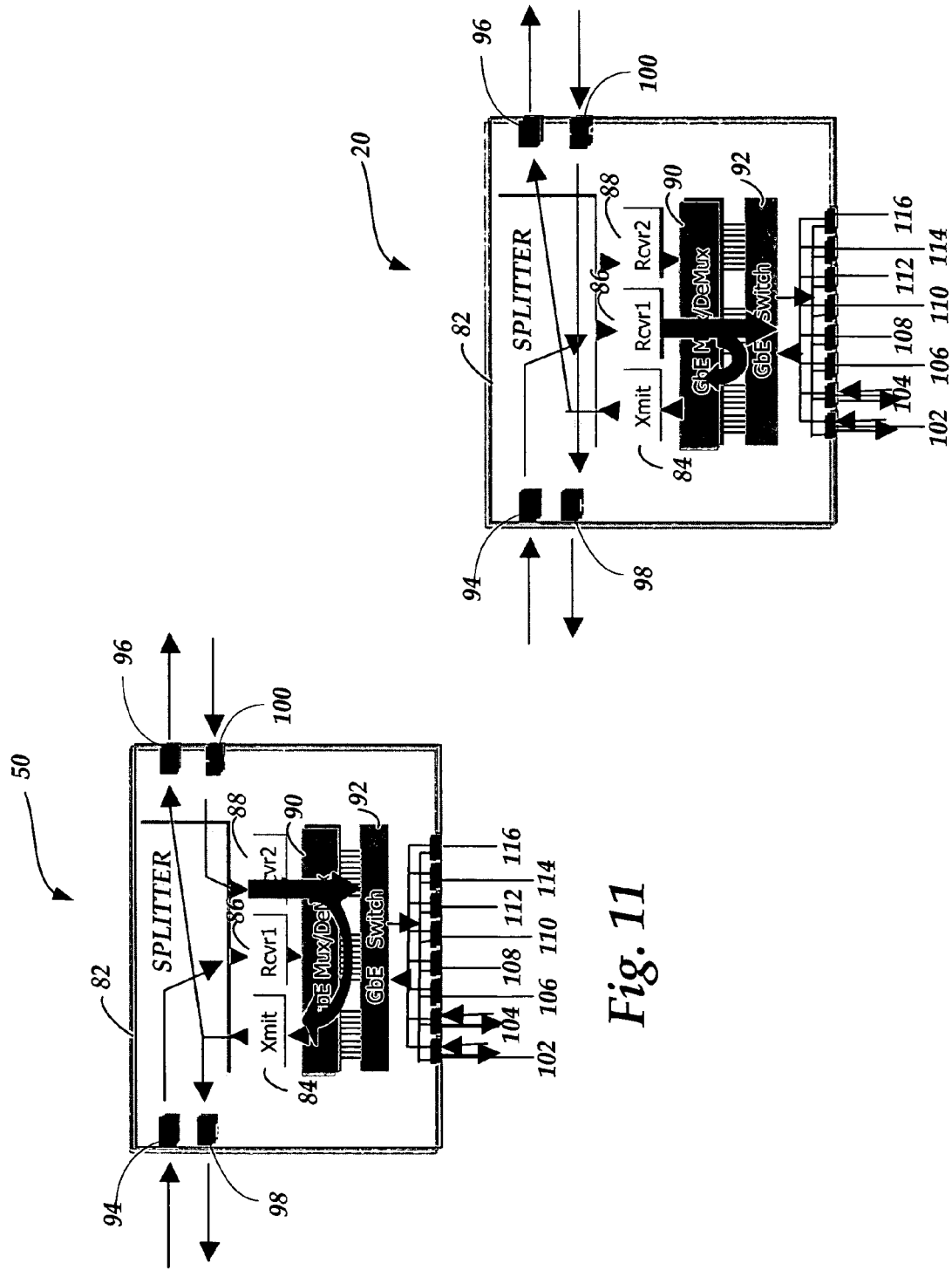
FIG. 11 is a block diagram of a node located downstream from a fault in a protected state of the multipath data network of FIG. 1, according to one embodiment of the present invention.
FIG. 12 is a block diagram of a node located upstream from a fault in a protected state of the multipath data network of FIG. 1, according to one embodiment of the present invention.

FIG. 8 is a flow diagram describing logical operations 800 for circumventing data around a fault from an upstream node, according to one embodiment of the present invention. The logical operations 800 will be discussed in conjunction with the node 20 shown in FIGS. 3B and 12. The logical operations 800 begin from off-page connector D and continue at operation 810 where the intelligent splitter 82 receives a data stream (along with embedded control messaging) from the primary path 60 over the network port 96. After determining from the control messaging that the node 20 is upstream from a detected fault, the intelligent splitter 82 passes the data stream and the control messaging to the switch 92 through the receiver 86 and the Mux/DeMux 90. The switch 92, upon receiving the data stream and control messaging from the intelligent splitter 82, then drops a portion of the data from the data stream received over the primary path 60 to the client ports 102 and 104. The logical operations 800 then continue from operation 810 at operation 820.

At operation 820, the intelligent splitter 82 receives new data inserted by the client ports 102 and 104 from the switch 92 and the Mux/DeMux 90. As discussed above in the description of FIG. 2, the switch 92 passes back data channels representing the remaining portion of the original data received from the data stream (i.e., the portion of the data not dropped) along with the new data received from the client ports 102 and 104 to the Mux/DeMux 90. The Mux/DeMux 90 then combines the data channels back into a single data stream for transmission by the transmitter 84 and the intelligent splitter 82. The logical operations 800 then continue from operation 820 at operation 830.

At operation 830, the intelligent splitter 82 receives the modified data stream containing the new data and transmits the data stream from the transmitter 84 over the primary path 60 via the network port 96 to adjacent node 30. The logical operations 800 then continue from operation 830 at operation 840. At operation 840, the intelligent splitter 82 receives and passes through the data stream from adjacent node 30 (which lies next to the fault) over the secondary path 70 via network ports 98 and 100 to circumvent the fault. The logical operations 800 then return from operation 840 to operation 490 (FIG. 4) where they then end.

It will be appreciated that the embodiments of the present invention provide for an apparatus and methods for the communication of a data stream and management of faults in a multipath data network having a protected ring-in-ring network architecture. The data stream is communicated over redundant paths between various nodes located throughout the network. Each node is capable of dropping and inserting data from the data stream before passing it on to the next node. A single transmitter in communication with an intelligent splitter at each node is utilized to simultaneously transmit the data stream over the redundant paths. In the event of a fault over one of the paths in the network, the intelligent splitter manages the operation of the single transmitter so that the data stream is communicated over an alternate path to circumvent the fault. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention; which is set forth in the following claims.

We claim:

1. An apparatus for communicating a plurality of data streams in a multipath data network, the apparatus comprising:
    a first receiver operative to receive data from a first data stream communicated over a primary path in the data network;
    a second receiver operative to receive data from a second data stream communicated over a secondary path in the data network;
    a transmitter operative to transmit data received from a node in the data network;
    a switch operative to receive data from the first receiver and the second receiver and send data to the transmitter; and
    an intelligent splitter operative to:

receive the data streams communicated over the primary and secondary paths in the data network;
send the first and second data streams to the first and second receivers;
receive a modified data steam from the transmitter;
simultaneously transmit the modified data stream over the primary and secondary paths in the data network;
parse the data stream for a control stream, the control stream comprising state information indicative of a fault in the data network; and
when the state information indicates that the node is downstream from the fault:
send the second data stream to the second receiver;
transmit the modified data stream over the secondary path; and
pass through a return data stream over the primary path.

2. The apparatus of claim 1, wherein the intelligent splitter is further operative to, when the state information indicates that the node is isolated from the fault:
send the second data stream to the second receiver; and
simultaneously transmit the modified data stream received from the transmitter over both the primary and secondary paths.

3. The apparatus of claim 1 wherein the intelligent splitter is further operative to, when the state information indicates that the node is upstream from the fault:
send the first data stream to the first receiver;
transmit the modified data stream over the primary path; and
pass through a return data stream over the secondary path.

4. The apparatus of claim 1, wherein the switch is further operative to:
drop a portion of the data from the first data stream and the second data stream received respectively from the first receiver and the second receiver to a plurality of ports; and
send new data from the plurality of ports to the transmitter, wherein the new data is included in the modified data stream.

5. An apparatus for communicating a plurality of data streams in a multipath data network, the apparatus comprising:
a first receiver operative to receive data from a first data stream communicated over a primary path in the data network;
a second receiver operative to receive data from a second data stream communicated over a secondary path in the data network;
a transmitter operative to transmit data received from a node in the data network;
a switch operative to receive data from the first receiver and the second receiver and send data to the transmitter; and
an intelligent splitter operative to:
receive the data streams communicated over the primary and secondary paths in the data network;
send the first and second data streams to the first and second receivers;
receive a modified data steam from the transmitter;
simultaneously transmit the modified data stream over the primary and secondary paths in the data network;
parse the data stream for a control stream, the control stream comprising state information indicative of a fault in the data network; and
when the state information indicates that the node is isolated from the fault,
send the second data stream to the second receiver; and
simultaneously transmit the modified data stream received from the transmitter over both the primary and secondary paths.

6. The apparatus of claim 5, wherein the intelligent splitter is further operative to, when the state information indicates that the node is downstream from the fault,
send the second data stream to the second receiver;
transmit the modified data stream over the secondary path; and
pass through a return data stream over the primary path.

7. The apparatus of claim 5, wherein the intelligent splitter is further operative to, when the state information indicates that the node is upstream from the fault,
send the first data stream to the first receiver;
transmit the modified data stream over the primary path; and
pass through a return data stream over the secondary path.

8. The apparatus of claim 5, wherein the switch is further operative to:
drop a portion of the data from the first data stream and the second data stream respectively received from the first receiver and the second receiver to a plurality of ports; and
send new data from the plurality of ports to the transmitter, wherein the new data is included in the modified data stream.

9. An apparatus for communicating a plurality of data streams in a multipath data network, the apparatus comprising:
a first receiver operative to receive data from a first data stream communicated over a primary path in the data network;
a second receiver operative to receive data from a second data stream communicated over a secondary path in the data network;
a transmitter operative to transmit data received from a node in the data network;
a switch operative to receive data from the first receiver and the second receiver and send data to the transmitter; and
an intelligent splitter operative to:
receive the data streams communicated over the primary and secondary paths in the data network;
send the first and second data streams to the first and second receivers;
receive a modified data steam from the transmitter;
simultaneously transmit the modified data stream over the primary and secondary paths in the data network;
parse the data stream for a control stream, the control stream comprising state information indicative of a fault in the data network; and
when the state information indicates that the node is upstream from the fault,
send the first data stream to the first receiver;
transmit the modified data stream over the primary path; and
pass through a return data stream over the secondary path.

10. The apparatus of claim 9, wherein the intelligent splitter is further operative to, when the state information indicates that the node is downstream from the fault,
send the second data stream to the second receiver;
transmit the modified data stream over the secondary path; and pass through a return data stream over the primary path.

11. The apparatus of claim 9, wherein the intelligent splitter is further operative to, when the state information indicates that the node is isolated from the fault,
send the second data stream to the second receiver; and
simultaneously transmit the modified data stream received from the transmitter over both the primary and secondary paths.

12. The apparatus of claim 9, wherein the switch is further operative to:
drop a portion of the data from the first data stream and the second data stream respectively received from the first receiver and the second receiver to a plurality of ports; and
send new data from the plurality of ports to the transmitter, wherein the new data is included in the modified data stream.

13. A method for communicating a plurality of data streams in a multipath data network, the method comprising:
receiving, at a first receiver, data from a first data stream communicated over a primary path in the data network;
receiving, at a second receiver, data from a second data stream communicated over a secondary path in the data network;
transmitting, from a transmitter, data received from a node in the data network;
receiving, at a switch, data from the first receiver and the second receiver and send data to the transmitter;
receiving, at an intelligent splitter, the data streams communicated over the primary and secondary paths in the data network;
sending, from the intelligent splitter, the first and second data streams to the first and second receivers;
receiving, at the intelligent splitter, a modified data steam from the transmitter;
simultaneously transmitting, from the intelligent splitter, the modified data stream over the primary and secondary paths in the data network; and
parsing, at the intelligent splitter, the data stream for a control stream, the control stream comprising state information indicative of a fault in the data network, when the state information indicates that the node is downstream from the fault,
sending the second data stream to the second receiver;
transmitting the modified data stream over the secondary path; and
passing through a return data stream over the primary path.

14. The method of claim 13, wherein when the state information indicates that the node is isolated from the fault, the method further comprises,
sending the second data stream to the second receiver; and
simultaneously transmitting the modified data stream received from the transmitter over both the primary and secondary paths.

15. The method of claim 13, wherein when the state information indicates that the node is upstream from the fault, the method further comprises:
sending the first data stream to the first receiver;
transmitting the modified data stream over the primary path; and
passing through a return data stream over the secondary path.

16. The method of claim 13, further comprising,
dropping, at the switch, a portion of the data from the first and second data streams received from the receiver to a plurality of ports; and
sending, from the switch, new data from the plurality of ports to the transmitter, wherein the new data is included in the modified data stream.

17. A method for communicating a plurality of data streams in a multipath data network, the method comprising:
receiving, at a first receiver, data from a first data stream communicated over a primary path in the data network;
receiving, at a second receiver, data from a second data stream communicated over a secondary path in the data network;
transmitting, from a transmitter, data received from a node in the data network;
receiving, at a switch, data from the first receiver and the second receiver and send data to the transmitter;
receiving, at an intelligent splitter, the data streams communicated over the primary and secondary paths in the data network;
sending, from the intelligent splitter, the first and second data streams to the first and second receivers;
receiving, at the intelligent splitter, a modified data steam from the transmitter;
simultaneously transmitting, from the intelligent splitter, the modified data stream over the primary and secondary paths in the data network;
parsing, at the intelligent splitter, the data stream for a control stream, the control stream comprising state information indicative of a fault in the data network, when the state information indicates that the node is isolated from the fault,
sending the second data stream to the second receiver; and
simultaneously transmitting the modified data stream received from the transmitter over both the primary and secondary paths.

18. The method of claim 17, wherein, when the state information indicates that the node is downstream from the fault, the method further comprises,
sending the second data stream to the second receiver;
transmitting the modified data stream over the secondary path; and
passing through a return data stream over the primary path.

19. The method of claim 17, wherein, when the state information indicates that the node is upstream from the fault, the method further comprises,
sending the first data stream to the first receiver;
transmitting the modified data stream over the primary path; and
passing through a return data stream over the secondary path.

20. The method of claim 17, further comprising,
dropping, at the switch, a portion of the data from the first data stream and the second data stream respectively received from the first receiver and the second receiver to a plurality of ports; and
sending, from the switch, new data from the plurality of ports to the transmitter, wherein the new data is included in the modified data stream.

21. A method for communicating a plurality of data streams in a multipath data network, the method comprising:
receiving, at a first receiver, data from a first data stream communicated over a primary path in the data network;
receiving, at a second receiver, data from a second data stream communicated over a secondary path in the data network;
transmitting, from a transmitter, data received from a node in the data network;

receiving, at a switch, data from the first receiver and the second receiver and send data to the transmitter;

receiving, at an intelligent splitter, the data streams communicated over the primary and secondary paths in the data network;

sending, from the intelligent splitter, the first and second data streams to the first and second receivers;

receiving, at the intelligent splitter, a modified data steam from the transmitter;

simultaneously transmitting, from the intelligent splitter, the modified data stream over the primary and secondary paths in the data network;

parsing, at the intelligent splitter, the data stream for a control stream, the control stream comprising state information indicative of a fault in the data network, when the state information indicates that the node is upstream from the fault, sending the first data stream to the first receiver;

transmitting the modified data stream over the primary path; and passing through a return data stream over the secondary path.

22. The method of claim 21, wherein, when the state information indicates that the node is downstream from the fault, the method further comprises, sending the second data stream to the second receiver;

transmitting the modified data stream over the secondary path; and passing through a return data stream over the primary path.

23. The method of claim 21, wherein, when the state information indicates that the node is isolated from the fault, the method further comprises, sending the second data stream to the second receiver; and simultaneously transmitting the modified data stream received from the transmitter over both the primary and secondary paths.

24. The method of claim 21, further comprising, dropping, at the switch, a portion of the data from the first data stream and the second data stream respectively received from the first receiver and the second receiver to a plurality of ports; and sending, from the switch, new data from the plurality of ports to the transmitter, wherein the new data is included in the modified data stream.

* * * * *